Sept. 28, 1948.  S. A. MOORE  2,450,153
VOLTAGE INDICATOR FOR ELECTRIC FENCES
Filed Oct. 9, 1944  3 Sheets-Sheet 1
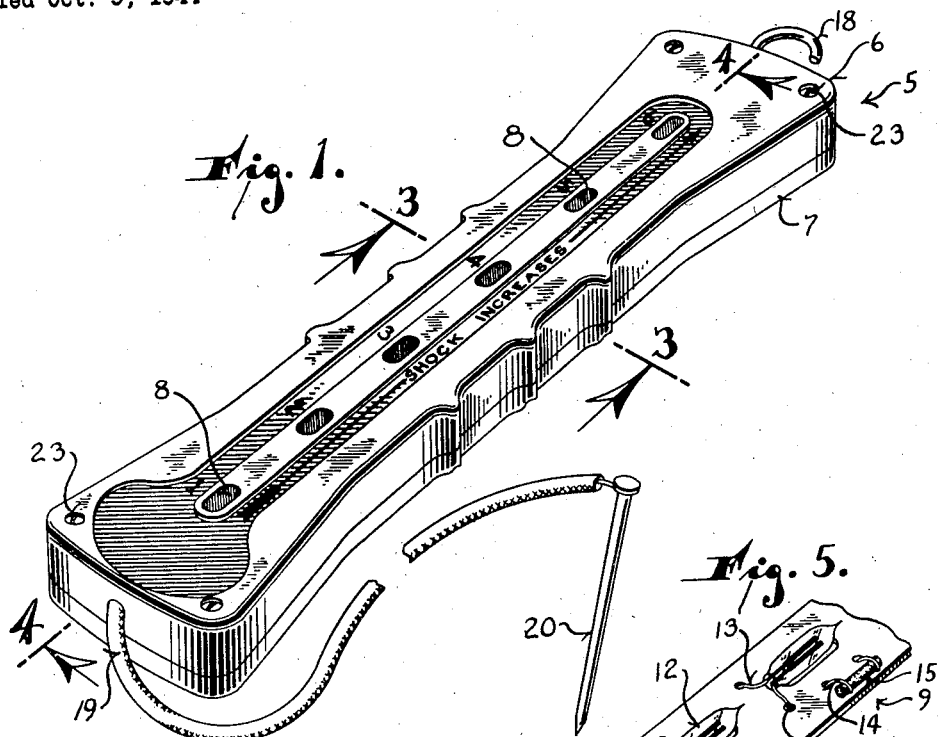
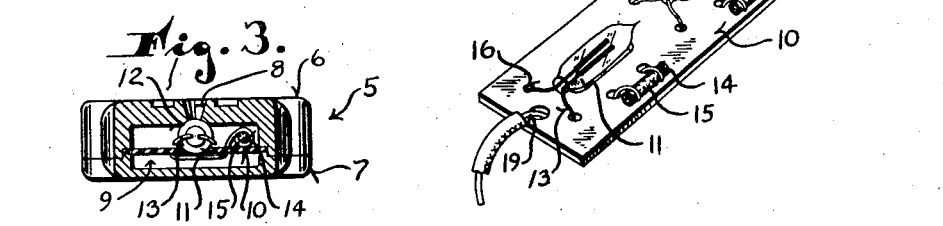
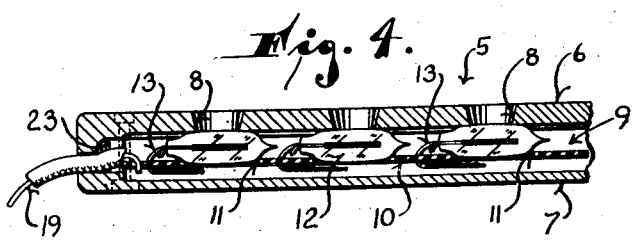
Inventor
Sidney A. Moore

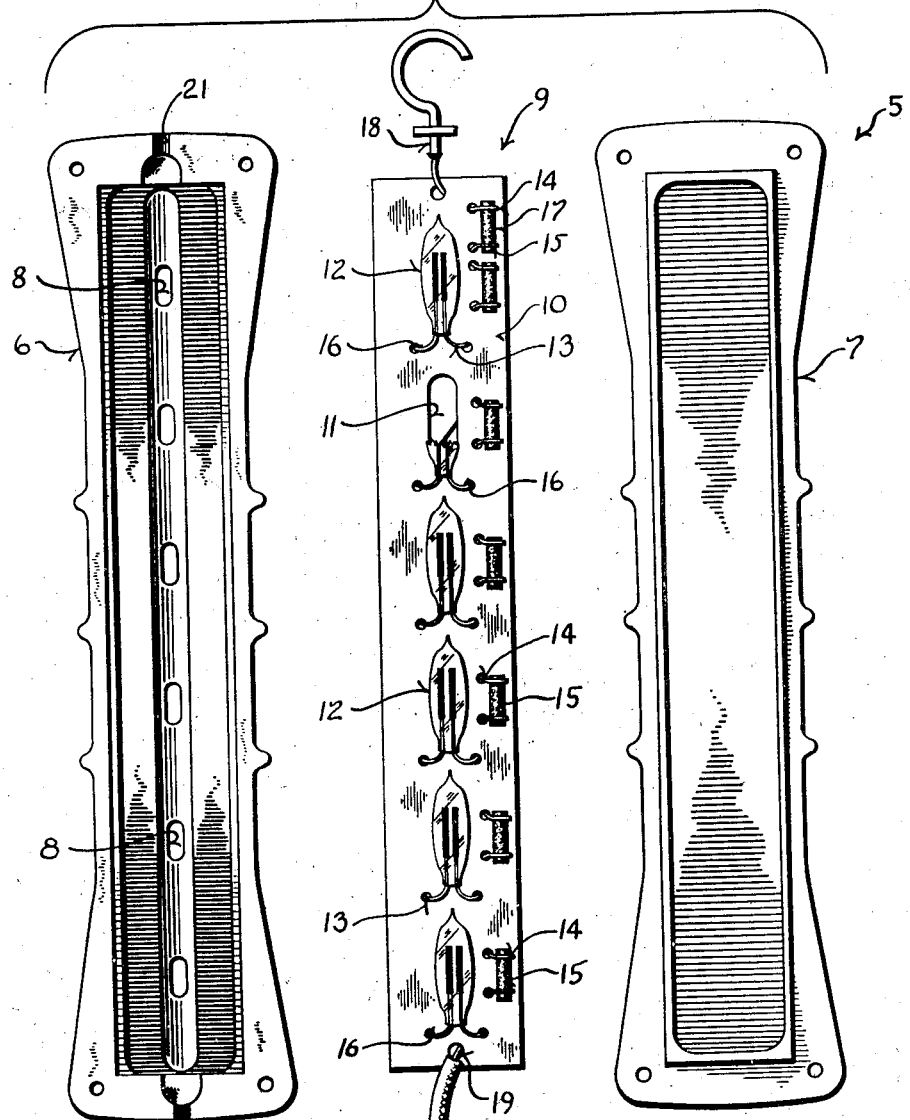
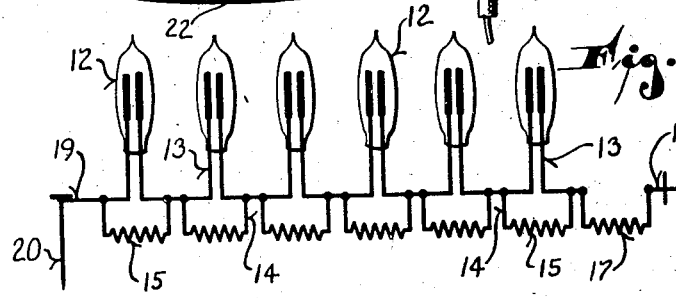

Sept. 28, 1948. S. A. MOORE 2,450,153
VOLTAGE INDICATOR FOR ELECTRIC FENCES
Filed Oct. 9, 1944 3 Sheets-Sheet 3
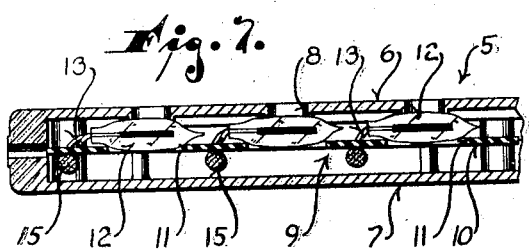
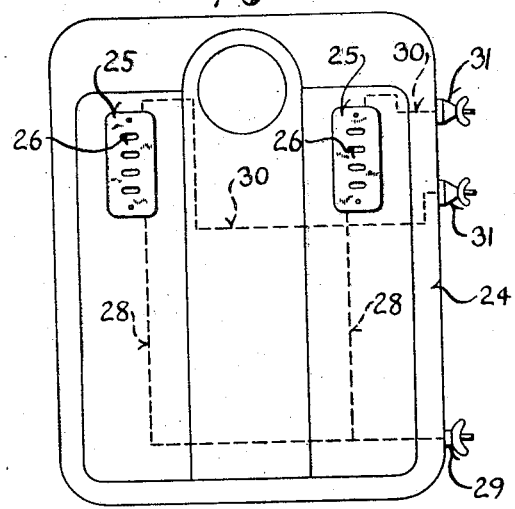
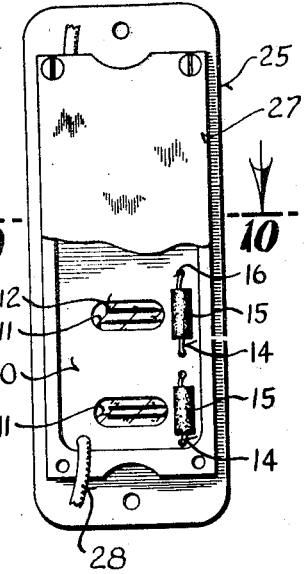
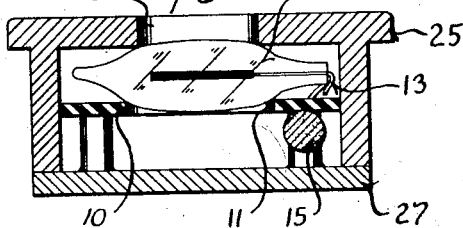
Inventor
Sidney A. Moore Patented Sept. 28, 1948

2,450,153

UNITED STATES PATENT OFFICE 2,450,153

VOLTAGE INDICATOR FOR ELECTRIC FENCES

Sidney A. Moore, Milwaukee, Wis., assignor to The Prime Manufacturing Company, Milwaukee, Wis., a corporation of Wisconsin Application October 9, 1944, Serial No. 557,924

1 Claim. (Cl. 175—183)

This invention relates to improvements in electric fences and refers particularly to testing devices therefor commonly referred to in the art as signals.

Heretofore, all signals or testing devices used for indicating the effectiveness of a charge on an electric fence consisted either of a lamp which burned with an intensity varying with the charge on the fence, or a meter, the pointer of which swung to and from an indicating position with each intermittent energization of the fence. It was difficult, even for an expert to judge the effectiveness of the charge on the fence by means of these testing devices or signals.

In the case of the lamp, which burned with varying intensity, light intensity had to be evaluated, which, of course, is very difficult, especially with varying light conditions. With the meter it was a matter of observing the very quick swing of the pointer and attempting to determine how far it swung.

It is, therefore, the primary object of this invention to provide an improved testing device or signal for electric fences which is not subject to either of these disadvantages and which is structurally simple and practical and readily mounted in back of the front panel of a fence controller or incorporated in a portable testing unit.

More specifically, it is an object of this invention to provide an electric fence testing device or signal wherein the desired indication is afforded by a row of neon glow bulbs so connected with the fence that the intensity of a charge thereon is indicated by the number of bulbs which light up with each periodic energization of the fence. Thus, it is a relatively simple matter to quickly determine the intensity of the charge on the fence for it is easy to observe how many bulbs light up with each energization of the fence.

Another object of this invention is to provide a testing device of the character described wherein the glow bulbs and the necessary resistors are so connected through their lead wires, that the connection thereof of itself mounts these elements on their supporting base.

Another object of this invention is to provide a neat appearing fence testing device in which all of the mechanism is contained within a relatively small conveniently handled housing consisting of complementary sections.

With the above and other objects in view, which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawings illustrate two complete examples of the physical embodiment of the invention constructed in accordance with the best modes so far devised for the practical application of the principles thereof, and in which:

Figure 1 is a perspective view of a fence tester embodying this invention;

Figure 2 is a plan view of the front and back housing sections and the bulb assembly shown separated;

Figure 3 is a cross-sectional view through Figure 1, taken on the plane of the line 3—3;

Figure 4 is a longitudinal sectional view of one end portion of the tester, said view being taken on the plane of the line 4—4 of Figure 1;

Figure 5 is a perspective view showing a portion of the bulb assembly;

Figure 6 is a wiring diagram of the electric circuit of the device;

Figure 7 is a longitudinal sectional view similar to Figure 4 but illustrating a slightly modified embodiment of the invention;

Figure 8 is a front view of a complete controller illustrating the embodiment of this invention therein;

Figure 9 is a back view of one of the testing devices shown in Figure 8 but removed from the controller panel and with part of the back cover of the testing device broken away; and Figure 10 is a cross-sectional view taken on the plane of the line 10—10 in Figure 9.

Referring now particularly to the accompanying drawings, in which like numerals indicate like parts, the numeral 5 designates generally the housing of a portable type testing device embodying this invention.

This housing consists of complementary front and back sections 6 and 7, respectively. Preferably these two housing sections are molded from a suitable plastic. The front section may be deeper than the back section, or as illustrated in the modified embodiment shown in Figure 7, the hollow cavities of the two sections may be of equal depth.

The front section has a row of window openings 8 therein. These windows are preferably consecutively numbered as shown in Figure 1 and in addition an arrow or other suitable legend may be provided on the front face to indicate the manner in which the testing device is to be read.

Contained within the housing is a glow bulb assembly indicated generally by the numeral 9. This assembly consists of a back panel in the form of a strip of insulating material 10 having a plurality of elongated holes 11 punched therein and spaced to conform with the spacing of the windows 8. These elongated holes provide pockets in which glow bulbs 12 are received.

The wire leads 13 which project from the glow bulbs are used to hold the glow bulbs on the strip 10. In the same manner the wire leads 14 of resistors 15 are employed to hold the resistors in position on the strip 10.

As shown in Figure 6, there is a resistor 15 for each glow bulb, and the connections of the wire leads of the glow bulbs and resistors are such as to connect the glow bulbs in series circuit with a resistor across each glow bulb. To enable the connections of the wire leads to hold the bulbs and resistors in place the strip 10 has small holes 16 through which the leads, or portions thereof, pass.

In that embodiment of the invention particularly shown in Figures 2 and 5, the glow bulbs and resistors are on the same side of the strip and the connections of their leads are behind the strip. It is also possible, and in some respects more convenient, to have the glow bulbs on one side and the resistors on the other side of the strip as specifically shown in Figure 7. In this case a resistor spans the distance between each pair of holes 16.

In addition to the resistors 15 there is a master calibrating resistor 17 connected between one end of the series circuit connected glow bulbs and a terminal 18 which may be in the form of a hook as shown in Figures 1 and 2 for conveniently connecting the testing device to a fence wire.

The other end of the series of glow bulbs has a conductor 19 leading therefrom, which in the case of the portable type of unit may have a grounding pin 20 connected thereto to facilitate grounding that end of the system.

The glow bulb-resistor assembly is held in place between the complementary front and back sections of the housing as clearly shown in Figures 3 and 7 with the glow bulbs confined between the rear of the front panel and the insulating strip or back panel 10 and with one glow bulb back of each window 8.

The terminals 18 and 19 pass through notches 21 and 22, respectively, when the front and back sections are secured together as by screws 23.

In the application of the invention to a fence controller as shown in Figures 8, 9 and 10 the front panel 24 of the cabinet in which the controller is housed has an enlarged window opening in which the indicating device of this invention is mounted. Where the fence controller is of the dual fence circuit type illustrated in the copending application of Sidney A. Moore, Serial No. 557,923 filed Oct. 9, 1944, now Patent No. 2,398,442 there are two such window openings in the front panel 24.

In any event the windows in the front panel 24 are completely closed by a front housing section 25 provided with a row of individual window openings 26 similar to the openings 8. The housing section 25 compares with the front housing section 6 but is shaped to fit the window opening in the front panel 24 and be secured thereto.

The cavity of the housing section 25 has a glow bulb-resistor assembly mounted therein in the same manner as described, being held in place by a back cover section 27. One end of each glow bulb-resistor assembly is connected by conductors 28 to the ground terminal 29 of the controller while the other terminal of each glow bulb-resistor assembly is connected by a suitable conductor 30 with one of the fence terminals 31. Thus the charge on each fence circuit is individually visually indicated by the number of glow bulbs connected thereacross which light up with each intermittent energization of the fence.

A short on either section results in all of the glow bulbs connected across that section remaining out, while a short from fence circuit to fence circuit is indicated by all of the glow bulbs failing to light up.

The portable indicating device of Figure 1, functions in the same manner to visually depict the condition of the fence being tested. Thus, assuming that the indicator has been attached to or hung by its hook-like terminal 18 to the fence wire to be tested and that its other ground terminal 20 has been driven into the ground, when the charge on the fence is at maximum effectiveness, all of the glow lamps flash concomitantly with the periodic energization of the fence wire.

In the event the fence wire is slightly grounded, which, of course, results in reduction of the voltage thereon, the flashing of one of the neon bulbs will be interrupted. Higher leakage causing further reduction in voltage on the fence results in another bulb of the series remaining out, and so on until in the case of a complete ground all of the bulbs remain out.

While the relationship of the values of the several resistors to achieve the result sought is undoubtedly clear to those skilled in the art, for purposes of illustration, but not with the intention of specific limitation, the values of the resistors to effect a desirable indicating sequence for an average electric fence installation are as follows: Referring to Figure 6 and reading from left to right, 500 m., 150 m., 70 m., 40 m., 25 m., 10 m., and 100 m.

Attention is directed to the fact that in both embodiments of the invention, that is, in the portable adaptation thereof shown in Figure 1 as well as the more or less permanent installation shown in Figure 8, the life of the bulbs is considerably extended because of the intermittent application of energy thereto. As a result, a substantial saving in cost can be effected by reducing the number of resistors required to the barest minimum. Only one resistor across each bulb plus a calibrating resistor in series with the entire unit is required.

Thus, as distinguished from previous indicators of the glow bulb type, no need exists for incorporating current limiting resistors in the circuit of each bulb.

From the foregoing description, taken in connection with the accompanying drawings, it will be readily apparent to those skilled in this art that this invention provides a testing device or signal for electric fences which entirely overcomes the chief disadvantage of all testing devices and signals heretofore in use; that it makes determination of the intensity of the shock on the fence a simple matter; and that the device is structurally practical and commercially feasible.

What I claim as my invention is:

In a device for indicating the effectiveness of the charge on an electric fence, the combination of: a front panel having a row of window openings therein; a back panel having a row of holes therein spaced to correspond with the spacing of the window openings in the front panel; a plurality of glow lamps one for each window opening, said lamps being larger than the window openings and the holes in the back panel; means for securing the panels together in spaced parallel relationship with the glow lamps held in place therebetween by a part of each lamp projecting into and bearing against the edges of a window opening in the front panel and another part of each lamp projecting into and bearing against the edges of the adjacent hole in the back panel; a plurality of resistors; conductors connecting the glow lamps and resistors in circuit with a different value of resistance across each lamp and with said difference resistance values arranged in series circuit and in order of magnitude from one end to the other of the bank of glow lamps, said resistors being on one side of the back panel and the terminals of the lamps being on the other side of the back panel, said conductors having portions thereof passing through holes in the back panel adjacent to the lamp receiving holes therein and holding the lamps and the resistors to the back panel so that the back panel, lamps and resistors comprise a sub-assembly capable of being mounted in place as a unit; a conductor leading from one end of the bank of glow lamps for connection to ground; and another conductor leading from the other end of the bank of glow lamps adapted to be connected to an electric fence.

SIDNEY A. MOORE.

REFERENCES CITED

The following references are of record in the file of this patent:

UNITED STATES PATENTS

| Number | Name | Date |
| --- | --- | --- |
| 1,688,976 | Lum | Oct. 23, 1928 |
| 1,744,840 | Strieby et al. | Jan. 28, 1930 |
| 1,796,730 | Slupinski | Mar. 17, 1931 |
| 1,915,709 | Wiseman | June 27, 1933 |
| 2,043,499 | Vendope | June 9, 1936 |
| 2,094,645 | Foulke | Oct. 5, 1937 |
| 2,179,199 | Reed | Nov. 7, 1939 |
| 2,244,009 | Hiensch et al. | June 3, 1941 |
| 2,259,328 | Sinninger | Oct. 14, 1941 |
| 2,329,063 | Lockwood | Sept. 7, 1943 |

FOREIGN PATENTS

| Number | Country | Date |
| --- | --- | --- |
| 126,233 | Austria | Jan. 11, 1932 |

OTHER REFERENCES

Superior Instruments Co., advertisement of Model 590 voltage tester, 1 page.